No. 814,686. PATENTED MAR. 13, 1906.
S. H. GARST.
MECHANICAL MOVEMENT.
APPLICATION FILED JAN. 19, 1905.
FIG. 1
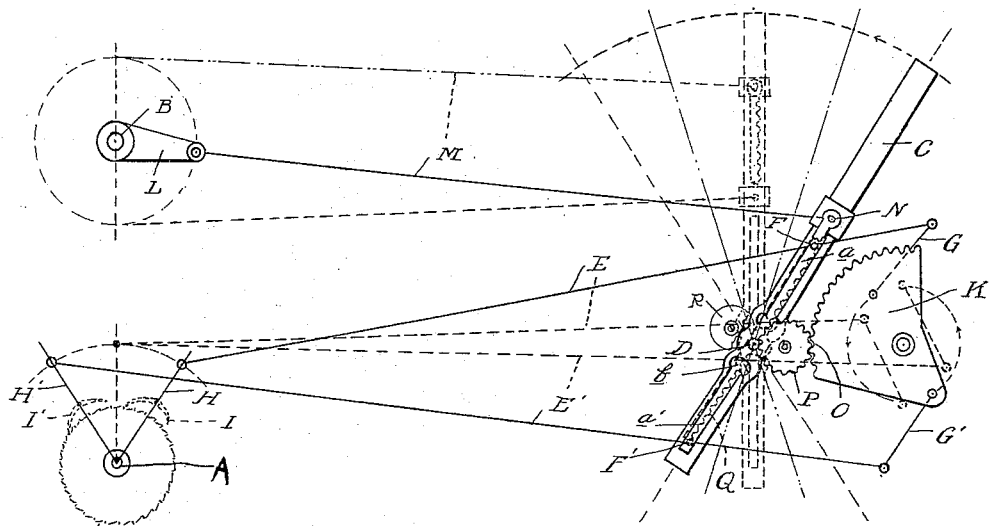
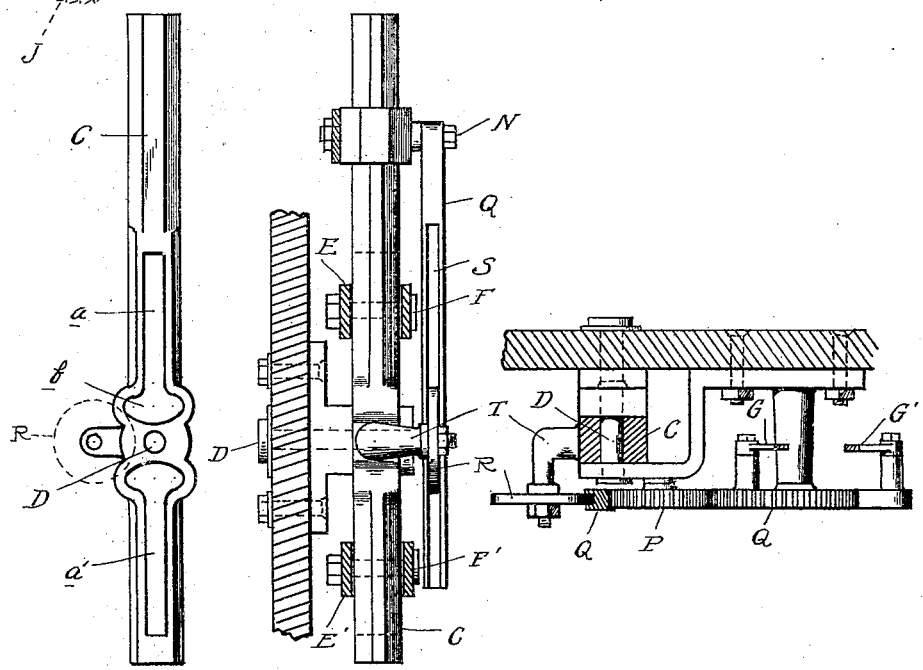
FIG. 2.   FIG. 3.   FIG. 4.
WITNESSES
INVENTOR
STEPHEN H. GARST
BY James Whittemore
ATT'Y.

UNITED STATES PATENT OFFICE.

STEPHEN H. GARST, OF DETROIT, MICHIGAN, ASSIGNOR TO AMERICAN HARROW COMPANY, OF DETROIT, MICHIGAN, A CORPORATION OF MICHIGAN.

MECHANICAL MOVEMENT.

No. 814,686.     Specification of Letters Patent.     Patented March 13, 1906.

Application filed January 19, 1905. Serial No. 241,828.

*To all whom it may concern:*

Be it known that I, STEPHEN H. GARST, a citizen of the United States, residing at Detroit, in the county of Wayne and State of Michigan, have invented certain new and useful Improvements in Mechanical Movements, of which the following is a specification, reference being had therein to the accompanying drawings.

The invention relates to mechanism for transmitting mechanical movement comprising a reciprocatory bar and means for varying the amplitude of movement thereof.

The invention consists in the peculiar construction, arrangement, and combination of parts, as hereinafter set forth.

In the drawings, Figure 1 is a diagrammatic view illustrating a portion of the mechanism. Fig. 2 is a face view of the rock-arm. Fig. 3 is a side elevation of a portion of the mechanism, and Fig. 4 is a sectional plan view thereof.

My improvement is more particularly designed for use for variable-feed mechanism and is adapted within certain limits to produce any desired variation. In the construction shown the member to be driven is a rotary shaft A and the drive member a rotary shaft B; but where desired either or both may be reciprocatory members.

C is a rock arm or lever fulcrumed upon a pivot D. E and E' are reciprocatory rods which are connected to the rock-arm C by slidable pivotal connections F F'. G is a pivotal link connected to one end of the rod E and adapted to swing substantially parallel to the movement of the rock-arm C. The opposite end of the rod E is connected to the driven member, and, as shown, this connection comprises the rock-arm H, which carries a pawl I, engaging a ratchet-wheel J, mounted on the shaft A, the arrangement being such that the rocking of the lever C will cause the reciprocation of the rod E, rock-arm H, and pawl I, thereby imparting an intermittent rotary movement to the ratchet-wheel J and shaft A.

To vary the movement of the rod E and the resulting actuation of the shaft A, the fulcrum for the link G is movable and may be shifted laterally of the direction of movement of the rod E, thereby adjusting the pivotal connection F toward or from the center D of the lever C. As shown, the link G is attached to the crank K, which when turned through a partial rotation will shift said link and adjust the pivot F, as has been described. This pivot F may be engaged with a longitudinal slot, such as *a* in the lever C, which permits it to slide inward or outward, while the link G serves to retain said pivot in each position of adjustment. Thus the movement of the crank K will effect any desired adjustment of the pivot F in its engagement with the slot *a*.

The lever C is rocked by suitable mechanism, which, as shown, comprises a crank L upon the drive-shaft B, which is connected by a rod M with a pivotal connection N on the lever C. This pivotal connection is slidable upon the lever C, so that by shifting it toward or from the fulcrum D a lesser or greater amplitude of movement is imparted to the lever by the rotation of the crank L.

It will be seen from the description above given that the degree of movement imparted to the shaft A is determined, first, by the adjustment of the crank K, which determines the position of the link G, and consequently the adjustment of the pivot F in the slot *a*; second, by the adjustment of the pivot N upon the lever C, which determines the amplitude of movement of said lever. In order to effect a quick variation in the movement of the driven member, I have provided mechanism by which these two adjustments may be simultaneously effected and the pivots N and F moved oppositely in relation to the fulcrum or center D of the lever C. This connection, as shown, comprises a segmental gear O, connected to the lever K to rotate therewith, said gear being in mesh with a pinion P, which in turn meshes with a rack Q, extending parallel to the lever C and attached at one end to the slidable pivotal connection N. Whenever the crank K is rotated to shift the position of the link G, the gear O will be correspondingly moved and through the intermediate pinion P will actuate the rack Q in the reverse direction. The effect will be that while the pivot F is moved in one direction—as, for instance, toward the fulcrum D—the pivot N will be moved in the opposite direction or outward from the fulcrum D. Each of these adjustments will diminish the movement imparted to the reciprocatory rod E and shaft A, and together they substantially double the variation. In the reverse movement of the crank K the pivot F will be adjusted outward, while the pivot N is adjusted inward, which will cause the rapid increase in the movement imparted to the rod E. In addition to the rod E, which has been described, I preferably provide a second rod E', which engages with an extension of the lever C on the opposite side of its fulcrum D and is provided with a supporting-link G' and the rock-arm H', having a pawl I'. These parts operate in the same manner as their corresponding parts, previously described, to impart an intermittent movement to the shaft A, which alternating with that effected by the rod E produces a substantially constant movement to the shaft A, the crank G' being also connected to the crank H at a point diametrically opposite to the connection, and the link G will be adjusted correspondingly and will effect a similar adjustment of the pivot F' in the slot a'.

In operation continuous movement being imparted to the shaft B it will be transmitted through the mechanism described to a substantially constant, though pulsating, movement of the shaft A. To change the degree of movement of the latter shaft, the crank K is turned, which may be effected by any suitable mechanism (not shown) to change the amplitude of movement of the rods E and E'. When the latter are adjusted with their pivots F and F' nearest to the fulcrum D, a very slight movement will be imparted thereto. If it is desired to prevent even this slight movement by enlarging the slots a, as indicated at b, a slight lost motion is provided for the pivots F in this position of adjustment, which will permit the rocking of the lever C without communicating any movement to the rods E E'.

In order to permit of the rocking of the lever C without materially changing the position of the pivotal connection N on said lever, the rack Q has its pitch-line substantially in line with the center of the lever passing through the fulcrum-pivot. Thus when the lever is rocked the rack Q will turn about the pinion P without changing the adjustment to any marked degree. There is, however, the necessity for a slight lateral movement of the rack, which is provided for by pivotally attaching it to the slidable pivotal connection N. The rack is held in engagement with the pinion by an antifriction-roller R, which engages with a groove S in the rear face of the rack and which is journaled upon a pin T, formed as a bracket secured to the lever C.

What I claim as my invention is—

1. A transmission mechanism comprising a longitudinally-slotted rock-arm, a rod actuated thereby, a pivot on said rod engaging said slot, a swinging link connected to said rod and means for shifting the pivot of said link to adjust said pin in said slot toward or from the fulcrum of said rock-arm, said slot being enlarged at its inner end to permit the limited movement of said arm, independent of said rod.

2. A transmission mechanism comprising a rock-lever, provided with arms extending oppositely from the fulcrum, reciprocatory rods connected to said opposite arms, pivotal connections between said rods and arms, longitudinally slidable on the latter, swinging links for said rods determining the path of movement thereof, and a double crank to which said links are pivoted, adapted to simultaneously and correspondingly shift said pivotal connections toward or from the fulcrum.

3. A transmission mechanism comprising a rock-arm, two reciprocatory rods pivotally connected thereto, the one constituting an actuating and the other an actuated member and means for simultaneously adjusting the pivotal connections of said rods oppositely in relation to the fulcrum of said rock-arm.

4. A transmission mechanism comprising a rotary crank, a rock-arm, a pitman-rod connecting said crank and rock-arm, a pivotal connection between said pitman and rock-arm, longitudinally adjustable on the latter, a reciprocatory rod, a pivotal connection between said rod adjustable longitudinally of said rock-arm, a swinging link connected to said rod and determining the path of movement thereof, means for shifting the pivot of said link to adjust the pivotal connection for said rod upon said rock-arm, and means simultaneously actuated for shifting the pivotal connection of said pitman on said rock-arm, oppositely in relation to the fulcrum.

5. A transmission mechanism comprising a longitudinally-slotted rock-arm and two reciprocatory rods, one constituting an actuating and the other an actuated member, a pivot for said actuated member longitudinally adjustable in said slot, a pivotal connection for said actuating member longitudinally adjustable on said rock-arm, a swinging link connected to said actuated rod, a crank to which said link is pivoted, forming the means for shifting the position thereof, a rack connected to said pivotal connection for said actuating-rod, a pinion meshing therewith, and a peripheral gear-segment on said crank engaging said pinion, whereby the pivotal connections for said rods are simultaneously shifted oppositely in relation to the fulcrum.

In testimony whereof I affix my signature in presence of two witnesses.

STEPHEN H. GARST.

Witnesses:
C. L. READ,
J. F. SHEEN.